Figure 1:
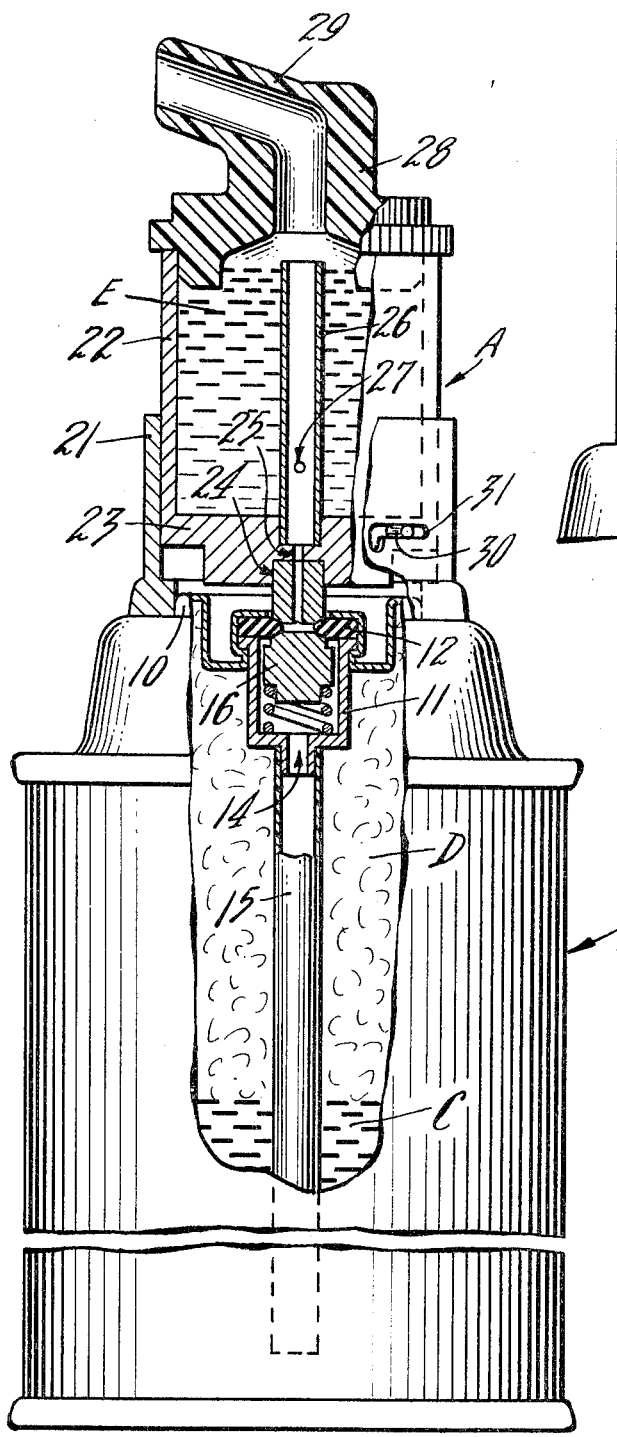

Dec. 13, 1966

L. L. MARRAFFINO 3,291,346

HOT LATHER SHAVE BLENDER

Filed Sept. 2, 1964

2 Sheets-Sheet 1

INVENTOR.
LEONARD L. MARRAFFINO
BY
Leland R. McCann
ATTORNEY

Dec. 13, 1966  L. L. MARRAFFINO  3,291,346
HOT LATHER SHAVE BLENDER
Filed Sept. 2, 1964  2 Sheets-Sheet 2
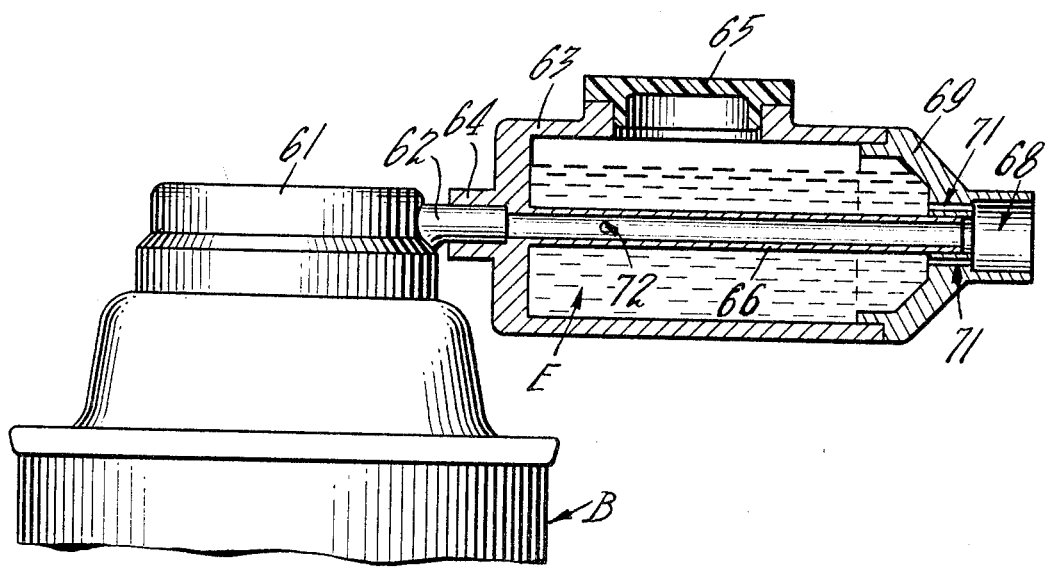
INVENTOR.
LEONARD L. MARRAFFINO
BY
Leland R. McCann
ATTORNEY

United States Patent Office 3,291,346
Patented Dec. 13, 1966

3,291,346
HOT LATHER SHAVE BLENDER
Leonard L. Marraffino, 121 Sunset Road,
Mamaroneck, N.Y.
Filed Sept. 2, 1964, Ser. No. 393,860
4 Claims. (Cl. 222—136)

The present invention relates generally to pressurized dispensing devices and has particular reference to means for and a method of blending an additive liquid with the contents of a pressurized dispensing container as the contents are dispensed therefrom.

The invention is particularly adapted to the production of an improved lather from well known shaving creams sold commercially in pressurized or so called aerosol type containers. In such containers the shaving cream is maintained under pressure by a gaseous propellant and is dispensed from the container by the propellant through a manually actuated valve having a release member which may be tilted or pressed inwardly to release the cream. The released cream is applicable directly to the face without using a brush.

Many of these shaving creams do not produce a suitable shaving lather without prior application of hot water to the face.

It is an object of the instant invention to overcome this difficulty by the provision of a method of and means for heating and moistening the shaving cream as it is dispensed from a pressurized container so that a hot moist lather is immediately available for use without prior wetting of the area to be shaved.

Numerous other objects and advantages of the invention will be apparent as it is better understood from the following description, which, taken in connection with the accompanying drawings, discloses a preferred embodiment thereof.

These objects are attained by the provision of a blending device which may be used with any conventional aerosol type pressurized dispensing container and which is readily attached to the dispensing end of such a container. Briefly, the blending device includes a small reservoir which is filled for use with hot household water, usually available in the temperature range of 120 to 150 degrees F. The device further includes a dispensing spout and a means for guiding toward the spout, shaving cream released from the container.

As the cream arrives at the dispensing spout a pressure is exerted on the hot water confined in the reservoir and this pressure forces the water into contact with the cream at the spout and thereby blends the water with the cream and converts the cream into a highly desirable wet or moist, hot, foamy lather which issues from the spout for immediate use. In aerosol type pressurized containers the gaseous propellant used to dispense the shaving cream necessarily mixes with the cream and in its entrapped form is dispensed with the cream. In the instant invention a portion of this entrapped propellant in the released cream is bled off or diverted into the hot water to create the pressure thereon as the cream travels toward the blending device dispensing spout.

Figure 2:
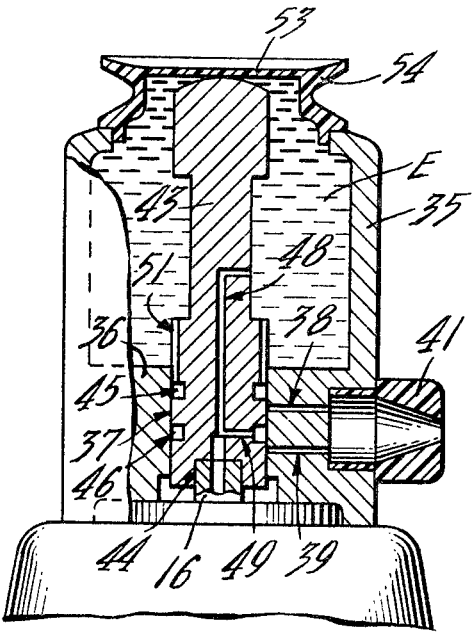

Referring to the drawings:

FIG. 1 is a part sectional, part elevational view of the device embodying the instant invention, the view showing the device in place on a pressurized container, with parts broken away, FIGS. 2 and 3 are part sectional, part elevational views similar to FIG. 1, and illustrating modified forms of the invention, and FIG. 4 is an end view of the device shown in FIG. 3.

The method of preparing and dispensing the above mentioned heated, moist, foamy lather from a gaseous propelled shaving cream contained in and dispensed from a pressurized container comprises the steps of releasing cream from the container, directing or guiding the released cream toward a dispensing spout provided on a blending device, supplying a bath or confined quantity of hot water (available household water) adjacent the dispensing spout, and blending the hot water with the released cream at the pouring spout as the cream enters the spout and is dispensed therefrom for use. The blending of the hot water with the cream preferably is effected by diverting into the confined water a portion of the gaseous propellant entrapped in the released shaving cream. The diverted propellant pressurizes and effects a turbulent flow of the water into contact with the cream.

As a preferred and exemplary embodiment of the means of the instant invention, FIG. 1 illustrates a blending device A attached to a conventional pressurized container B containing shaving cream C maintained under pressure by a gaseous medium propellant D. Such a conventional pressurized container carries in its top end 10 a manually controlled discharge or dispensing valve of the type which comprises a cylindrical valve housing 11 located inside the container and secured to the top thereof and sealed by a gasket 12. The lower end of the housing 11 is provided with an orifice 14 which communicates with a tube 15 extending from the housing into the shaving cream in the container. Within the valve housing 11 there is disposed a spring pressed normally closed valve stem 16 which extends upwardly through the gasket 12 and projects above the top of the container. A T shaped passageway in the upper end of the stem 16 is normally sealed by the gasket 12. This is a conventional valve construction.

When the projecting valve 16 is tilted or pressed inwardly, the T shaped passageway is shifted out of register with the gasket 12 to effect dispensing of the cream C under pressure of the propellant gas D.

The blending device A as shown in FIG. 1 comprises a cylindrical sleeve 21 which rests on the top end of the container B and frictionally engages over a part of the container such as the projecting seam which secures the top 10 to the container. A hollow cylinder 22 constituting a reservoir is slidably disposed within the sleeve 21 for vertical movement relative thereto.

At its lower end the cylinder 22 is provided with an integral closed bottom 23 having a recess 24 which receives the upper end of the valve stem 16. Concentric with this recess 24 the bottom 23 is formed with a passageway 25 which at its lower end communicates with the T shaped passageway in the stem 16. At its upper end the passageway 25 communicates with the interior of a tube 26 which is carried on the bottom 23 or formed integral therewith and extends vertically through the cylinder 22, terminating just below the upper end of the cylinder. Near its lower end, the tube 26 is provided with a bleed hole 27 of approximately .012 inch in diameter. This bleed hole communicates with the interior of the cylinder 22.

The upper end of the cylinder 22 is closed with a removable slip cover 28 preferably made of a suitable plastic material. This cover is formed with a discharge spout 29 the interior of which terminates adjacent to and in spaced relation to the open top end of the tube 26.

In operation, the blending device A is pressed into place on the top end of the container B, its cover 28 removed, and the cylinder or reservoir 22 filled with hot water E in the range of 120 to 150 degrees F. The cover 28 is then replaced to confine the water as a bath and by hand pressure on the cover, the cylinder 22 is pushed downwardly within the sleeve 21. This downward movement of the cylinder 22, presses the valve stem 16 downwardly into open position and thereby releases shaving cream C from the container. The released cream flows upwardly through the passageway 25 in the cylinder bottom 23 and rises in the tube 26 toward its open top end.

Simultaneously with this movement of the cream through the tube, propellant gas entrapped or combined with the cream, escapes through the bleed hole 27 and enters the hot water E. This escaping gas builds up a pressure on the confined hot water and creates a turbulence therein with the result that the hot water and the cream as the latter flows from the top end of the tube 26 at the entrance to the spout 29, are mixed or blended to produce a desirable hot, moist, foamy lather which is forced up into the cover 28 and discharged from the spout 29 for immediate use.

Provision is made to lock the cylinder 22 against movement relative to the sleeve 21 when the device is not in use. For this purpose the cylinder near its lower end carries a locking pin 30 which projects outwardly into a bayonet shaped slot 31. When the pin 30 is in the horizontal leg of the slot, the device is locked and when the cylinder is rotated to locate the pin in the vertical leg of the slot, the device is unlocked for use.

FIG. 2 illustrates a modified form of the invention in which there is provided a hollow cylinder or reservoir 35 which is fitted directly to the seam of the container top 10 and like the cylinder 22 in the preferred form of the invention is adapted to be filled with hot water when in use. This cylinder 35 is formed with a relatively thick bottom wall 36 having a vertical bore 37 disposed concentric with the valve stem 16 of the pressurized container B. A pair of spaced and parallel conduits 38, 39 in the bottom wall 36 extend from the bore 37 into a dispensing or discharge spout 41 disposed in the side of the cylinder 35.

Disposed within the bore 37 is a vertically slidable plunger 43, which at its lower end is formed with a recess 44 to receive the upper projecting end of the valve stem 16 of the container B. Within the bore 37, the outer periphery of the plunger 43 is formed with a pair of spaced and parallel encircling grooves 45, 46 which normally are adjacent to but out of registration with the conduits 38, 39 in the cylinder bottom wall 36.

In addition to the circular grooves 45, 46, the plunger 43 is formed with a central passageway 48 which at its lower end communicates with the T shaped passageway in the valve stem 16. The upper end of the passageway 48 extends radially into communication with the interior of the cylinder 35. A short radial conduit 49 in the plunger 43 extends from the central passageway 48 to the lower circular groove 46. Vertical grooves or splines 51 in the outside face of the plunger 43 communicate with the interior of the cylinder 35 and with the upper circular groove 45 in the plunger.

The plunger 43 extends upwardly through the cylinder 35 and at its upper end engages against a flexible diaphragm 53 of a removable slip cover 54 attached to the upper end of the cylinder.

When hand pressure is applied to the flexible diaphragm 53, the plunger 43 is forced down against the valve stem 16 to open the valve as in the preferred form of the invention. This action aligns the circular grooves 45, 46 in the plunger 43 with the radial conduits 38, 39 in the cylinder bottom wall 36 and also through the opening of the container valve, releases pressurized shaving cream from the valve stem 16.

The released shaving cream flows from the valve stem 16 into the central passageway 48, circular groove 46, and conduit 39, discharging into the dispensing spout 41. Simultaneously with this action propellant gas entrapped in the flowing cream escapes up through the central passageway 48 into the hot water E in the cylinder 35.

As in the preferred form of the invention the escaping gas builds up a pressure on the water in the cylinder 35 and creates a turbulence therein, forcing the water down through the vertical grooves or splines 51 of the plunger and into the upper circular groove 45 and connecting conduit 38 where it discharges into the spout 41. In the spout the water mixes and blends with the shaving cream to produce the desirable hot, moist, foamy lather for shaving use as hereinbefore mentioned in connection with the preferred form of the invention.

FIGS. 3 and 4 disclose a further modified form of the invention which is adapted to be used with pressurized containers which do not have an exposed valve stem. In this type of container the valve stem is enclosed with a cap 61 to be pressed down to open the valve. Dispensing of the shaving cream is effected through a projecting spout 62.

In this form of the invention, which is very similar to the preferred form, a cylinder 63 adapted to be filled with hot water, is disposed in a horizontal position and at one end is formed with a recessed projection 64 to receive the spout 62 of the container. A removable cap 65 is provided on the cylinder to facilitate filling the cylinder with hot water. A tube 66 extends the full length of the cylinder and at one end communicates with the recessed projection 64 and at its opposite end communicates with a dispensing or discharge spout 68 formed in an end member 69 attached to the end of the cylinder. A plurality of ports 71 are formed in the end member 69, around the tube 66 and connecting the interior of the cylinder 63 with the dispensing spout 68. A bleed hole 72 is also provided in the tube 66 as in the preferred form of the invention.

In this form of the invention, pressure on the container cap 61 releases pressurized shaving cream into the dispensing spout 68 by way of the tube 66. Propellant gas entrapped in the cream, escapes through the bleed hole 72 into the water in the cylinder 63 and there builds up a pressure and turbulence in the water as before mentioned, thus forcing hot water through the ports 71 into the dispensing spout 68 to mix and blend with the shaving cream in the spout to produce the desirable hot, moist, foamy lather for immediate use without having to previously wet the area to be shaved.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A blending and dispensing device for mixing a liquid with a gaseous propelled creamy substance dispensed from a pressurized container to produce a wetted foam, comprising a reservoir for holding a blending liquid, a dispensing spout connected to said reservoir, channel means for guiding to said dispensing spout pressurized creamy substance released from said container, and bleed means for bleeding off into said liquid a portion of the gaseous propellant entrapped in said released creamy substance to pressurize and create a turbulence of said liquid sufficient to blend said liquid with said creamy substance at said dispensing spout to produce and dispense said creamy substance as a moist foam, said channel means including a hollow tube extending into said reservoir with one end in communication with a dispensing valve on said pressurized container and with its opposite end disposed adjacent said dispensing spout and wherein said bleed means is an orifice in said tube.

2. A blending and dispensing device for preparing and dispensing a heated, moist, foamy lather from a gaseous propelled shaving cream contained in and dispensed from a pressurized container having a valve outlet, comprising a movable reservoir for holding hot water, said reservoir at one end engaging said container valve outlet for opening and closing said outlet through movement of said reservoir, a mounting engageable with said container for said reservoir, a lather dispensing spout on said reservoir, a tubular passageway extending through said reservoir, said passageway at one end communicating with said valve outlet and at its opposite end terminating at the entrance to said spout for guiding to said spout gas propelled shaving cream released from said container when said valve outlet is open, and a bleed hole in said tubular passageway for diverting into said reservoir a portion of said gas propellant entrapped in said released shaving cream in said passageway to pressurize and effect a turbulent flow of said hot water into blending contact with said shaving cream at said spout to produce and dispense from said spout a hot, moist, foamy shaving lather.

3. A blending and dispensing device for preparing and dispensing a heated, moist, foamy lather from a gaseous propelled shaving cream contained in and dispensed from a pressurized container having a valve outlet, comprising a reservoir mountable on said container for holding hot water, a lather dispensing spout on said reservoir, a flexible diaphragm on said reservoir, a movable plunger in said reservoir, said plunger having one end engaging said container valve outlet and its opposite end engaging said diaphragm for opening and closing said outlet through external pressure applied to said diaphragm, passageways in said plunger and in said reservoir connecting said valve outlet with said lather dispensing spout for guiding to said spout gas propelled shaving cream released from said container when said valve outlet is open, and other passageways in said plunger and in said reservoir connecting said outlet valve, said reservoir and said lather dispensing spout for diverting into said reservoir a portion of said gas propellant entrapped in said released shaving cream in said first mentioned passageways to pressurize and effect a turbulent flow of said hot water from said reservoir into said dispensing spout to blend with said shaving cream in said spout to produce and dispense from said spout a heated, moist, foamy shaving lather.

4. A blending and dispensing device for preparing and dispensing a heated, moist, foamy lather from a gaseous propelled shaving cream contained in and dispensed from a pressurized container having a dispensing spout, comprising a reservoir mountable on said container spout for holding hot water, a lather dispensing spout on said reservoir, a tubular passageway extending through said reservoir and connecting said container spout with said lather dispensing spout for guiding to said lather dispensing spout gas propelled shaving cream released from said container, a bleed hole in said tubular passageway for diverting into said reservoir a portion of said gas propellant entrapped in said released shaving cream in said tubular passageway to pressurize and effect a turbulent flow of said hot water in said reservoir, and at least one port connecting said reservoir with said lather dispensing spout for guiding said turbulent flow of hot water into blending contact with said shaving cream in said lather dispensing spout to produce and dispense from said spout a heated, moist, foamy shaving lather.

References Cited by the Examiner

UNITED STATES PATENTS

| | | | |
|---|---|---|---|
| 636,226 | 10/1899 | Halvorson | 222—394 |
| 1,502,698 | 7/1924 | Tooley | 222—183 X |
| 1,537,552 | 5/1925 | Rotunno | 222 146 |
| 2,655,480 | 10/1953 | Spitzer et al. | 252—90 |
| 2,971,793 | 2/1961 | Peterson et al. | 291—1 |
| 2,995,278 | 8/1961 | Clapp | 222—394 |
| 3,105,104 | 9/1963 | Neiss | 222—394 X |
| 3,175,733 | 3/1965 | Lerner | 222—146 |
| 3,199,788 | 8/1965 | Davis | 239—337 X |
| 3,207,369 | 9/1965 | Rossi | 222—146 X |
| 3,217,938 | 11/1965 | Ayres | 222—146 |
| 3,240,396 | 3/1966 | Fridenberg | 222—146 |

RAPHAEL M. LUPO, *Primary Examiner.*